United States Patent [19]

Hata et al.

[11] Patent Number: 4,731,853
[45] Date of Patent: Mar. 15, 1988

[54] THREE-DIMENSIONAL VISION SYSTEM

[75] Inventors: Seiji Hata, Fujisawa; Takushi Okada, Yokohama; Makoto Ariga, Yokohama; Takafumi Okabe, Yokohama, all of Japan

[73] Assignee: Hitachi, Ltd., Tokyo, Japan

[21] Appl. No.: 714,455

[22] Filed: Mar. 21, 1985

[30] Foreign Application Priority Data

Mar. 26, 1984 [JP] Japan .................................. 59-56199

[51] Int. Cl.$^4$ .............................................. G06K 9/00
[52] U.S. Cl. ........................................ 382/1; 356/376; 358/101; 382/8; 382/50; 382/58
[58] Field of Search .................. 356/17, 18, 376, 394; 382/58, 50; 250/202, 560; 358/96, 101; 414/730; 901/35, 47; 364/513, 559

[56] References Cited

U.S. PATENT DOCUMENTS

| | | |
|---|---|---|
| 3,806,253 | 4/1974 | Denton . |
| 3,894,802 | 7/1975 | Higgins . |
| 3,905,045 | 9/1975 | Nickel . |
| 4,128,830 | 12/1978 | Weythman ............................ 382/50 |
| 4,188,544 | 2/1980 | Chasson ............................... 356/376 |
| 4,219,847 | 8/1980 | Pinkney et al. . |
| 4,305,130 | 12/1981 | Kelley et al. . |
| 4,343,553 | 8/1982 | Nakagawa et al. .................. 358/101 |
| 4,399,461 | 8/1983 | Powell . |
| 4,399,554 | 8/1983 | Perkins, III et al. . |
| 4,402,053 | 8/1983 | Kelley et al. . |
| 4,435,837 | 3/1984 | Abernathy . |
| 4,443,706 | 4/1984 | DiMatteo et al. . |
| 4,450,579 | 5/1984 | Nakashima et al. . |
| 4,485,409 | 11/1984 | Schumacher . |
| 4,486,842 | 12/1984 | Hermann . |
| 4,525,858 | 5/1985 | Cline et al. . |
| 4,545,067 | 10/1985 | Juvin et al. . |
| 4,566,124 | 1/1986 | Yamamoto . |
| 4,573,191 | 2/1986 | Kidode et al. . |
| 4,575,304 | 3/1986 | Nakagawa et al. .................. 414/730 |
| 4,611,292 | 9/1986 | Ninomiya et al. . |

FOREIGN PATENT DOCUMENTS 56-157083  5/1981  Japan .

OTHER PUBLICATIONS

"Structured Light Method for Inspection of Solder Joints and Assembly Robot Vision System" by Nakagawa et al. from the First International Symposium on Robotics Research.
Pattern Recognition, Pergamon Press 1972, vol. 4, "Extraction of the Line Drawing of 3-Dimensional Objects by Sequential Illumination from Several Direction", Y. Shirai and S. Tsuji, pp. 343-351.
9th Int. Sym. Ind. Robots, 1979, Washington, D.C., "A Vision System for Real Timme Control of Robots", G. J. Vander Brug et al., pp. 213-231.
"A Visual Sensor for Arc-Welding Robots", Bamba et al., Mitsubishi Electric Corp.
SPIE vol. 336, Robot Vision (1982), "Six-Dimension Vision System", Albus et al., pp. 142-153.
IEEE Computer Society Conference, Washington, D.C. Jun. 19-23, 1983, "Measuring the Shape of 3-D Objects", O. D. Faugeras and E. Pauchon, pp. 2-7.

Primary Examiner—Leo H. Boudreau
Attorney, Agent, or Firm—Fay, Sharpe, Beall, Fagan, Minnich & McKee

[57] ABSTRACT

The present invention consists in a three-dimensional vision system comprising a three-dimensional vision sensor which projects slit-like light on an object to-be-handled and which reads out a resulting slit image, an image input portion which controls the slit-like light to be lit up and put out and also controls the read-out of the slit image and which performs extraction processing of differential signals as to image signals read out, and an image processor which performs required controls concerning said image input portion and which processes image data of said image input portion; an image with the projected slit-like light and an image without it being sequentially sampled on an identical scanning line of the read-out image so as to obtain the differential image between them, thereby to extract a light segmentation line based on the projected slit-like light.

25 Claims, 5 Drawing Figures

THREE-DIMENSIONAL VISION SYSTEM

BACKGROUND OF THE INVENTION

The present invention relates to a three-dimensional vision system which recognizes the three-dimensional shape of an object by the use of slit-like light segmentation when the object is subjected to the operations of assembly etc. in a robot, an automaton etc.

Prior-art vision sensors which apply light segmentation are, for example, CONSIGHT published by General Motors in U.S. (literature: M. R. Ward et al, "CONSIGHT An Adaptive Robot with Vision", Robotics Today, pp. 26–32 (Summer, 1979)) and a compact robot vision published by Hitachi Ltd. (literature: Nakagawa et al, Structured light method for inspection of solder joints and assembly robot vision system: Proc. of 1st Int. Symp. of Robots Res. Bretton Woods, Aug. 28–Sept. 2, '83). In a case where the surface of an object to be seen is liable to irregularly reflect light and where external light conditions are stable, such a vision sensor based on the light segmentation system can receive a clear image and is therefore a very excellent system capable of three-dimensional image inputing. However, in a case where the object to be handled has a blackish surface liable to absorb light or where it has a reflectivity close to the total reflection, the quantity of light to enter the image sensor is comparatively small, and the extraction of a light segmentation line has been difficult under the influences of a background image etc. The reason why the extraction of the light segmentation line becomes difficult when the reflected light entering the image sensor lessens due to the properties of the surface of the object to-be-handled, is that a background object brighter than reflected light from the light segmentation line on the object to-be-handled becomes prone to appear in an image screen due to illumination based on external light.

Moreover, in a case where the fluctuation of external light is great, a segmentation decision threshold value in a light segmentation line extracting circuit fluctuates greatly, and stable light segmentation line extraction has been difficult. The reason is that, since the input image from the image sensor has a brightness obtained by adding up the light segmentation illumination and the external light illumination, the threshold value for deciding the segmentation line must be sharply changed on account of the fluctuation of the external light.

SUMMARY OF THE INVENTION

An object of the present invention is to provide a three-dimensional vision system which can extract a light segmentation line stably without being affected by the surface condition of an object to-be-handled, the fluctuation of external light, etc. and can precisely recognize a three-dimensional shape.

The present invention for accomplishing the object consists in a three-dimensional vision system comprising a three-dimensional vision sensor which projects slit-like light on an object to-be-handled and which reads out a resulting slit image, an image input portion which controls the slit-like to be lit up and put out and also controls the read-out of the slit image and which performs extraction processing of differential signals as to image signals read out, and an image processor which performs required controls concerning said image input portion and which processes image data of said image input portion; an image with the projected slit-like light and an image without it being sequentially sampled on an identical scanning line of the read-out image so as to obtain the differential image between them, thereby to extract a light segmentation line based on the projected slit-like light and to recognize an attitude and position of the object to-be-handled in three dimensions from the extracted light segmentation line.

That is, according to the present invention, when a light segmentation line is input, the projected image of the light segmentation line and a background image without projecting the light segmentation line are input in two operations, and the background image is subtracted from the projected image, whereby the image of only the light segmentation line is extracted, and the background image formed by external light and a fluctuant component attributed to the external light are removed from the light segmentation image.

DETAILED DESCRIPTION OF THE PREFERRED EMBODIMENT

Figure 1:
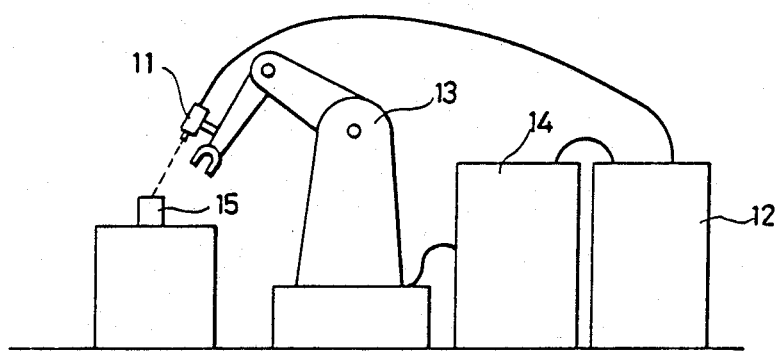
FIG. 1 is a system arrangement diagram of an embodiment of a light segmentation extraction circuit according to the present invention.

Now, the present invention will be described in conjunction with an embodiment shown in the drawings.

FIG. 1 is a view which shows the schematic arrangement of a three-dimensional vision system according to the present invention. In the arrangement of the system, an image input from a three-dimensional vision sensor (range finder) 11 mounted on the hand of a robot 13 is fed into an image processing apparatus 12, in which the position and attitude of an object to-be-handled 15 are calculated by image processing. The results are transferred to a robot control device 14, and the robot 13 performs, e.g., the operation of gripping the object under the control of the control device.

Figure 2A:
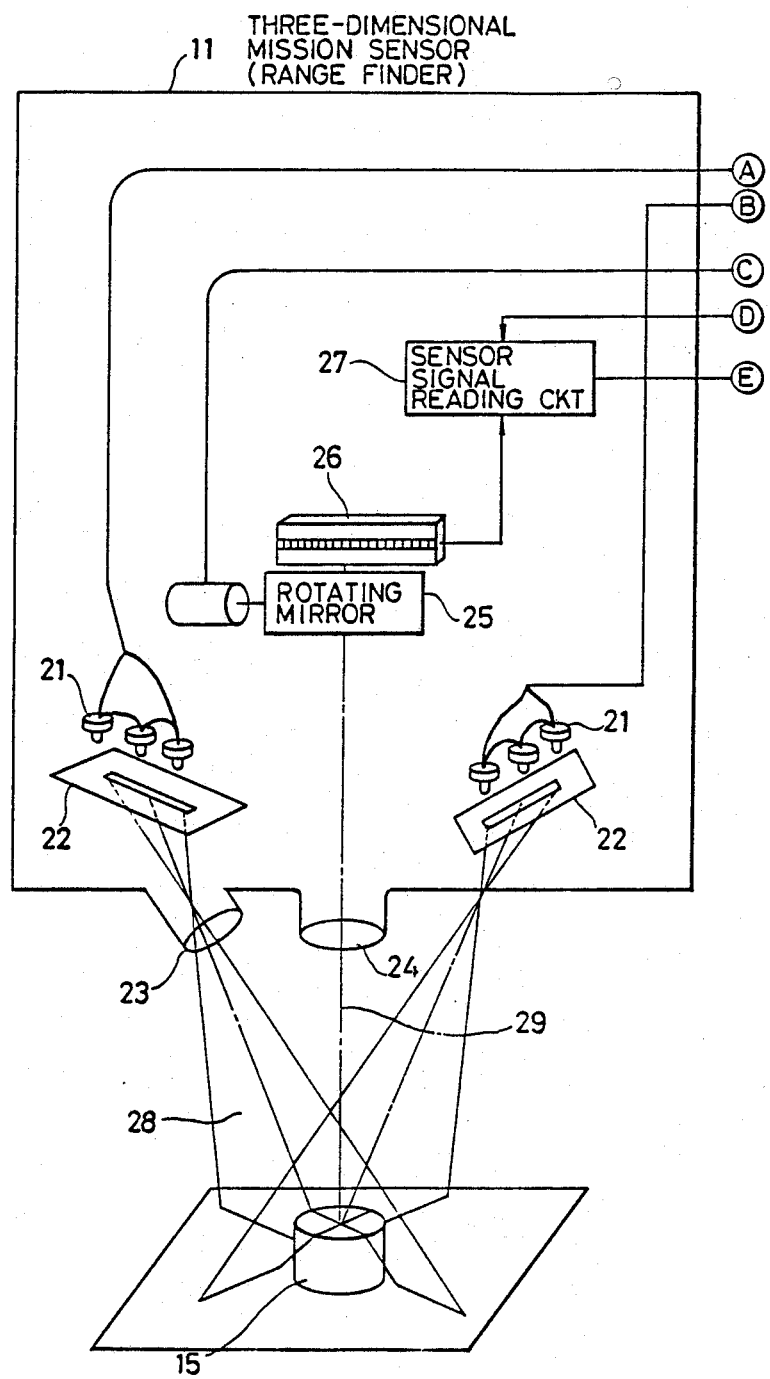
FIGS. 2A and 2B are parts of a folded detailed block diagram of the embodiment.
Figure 2B:
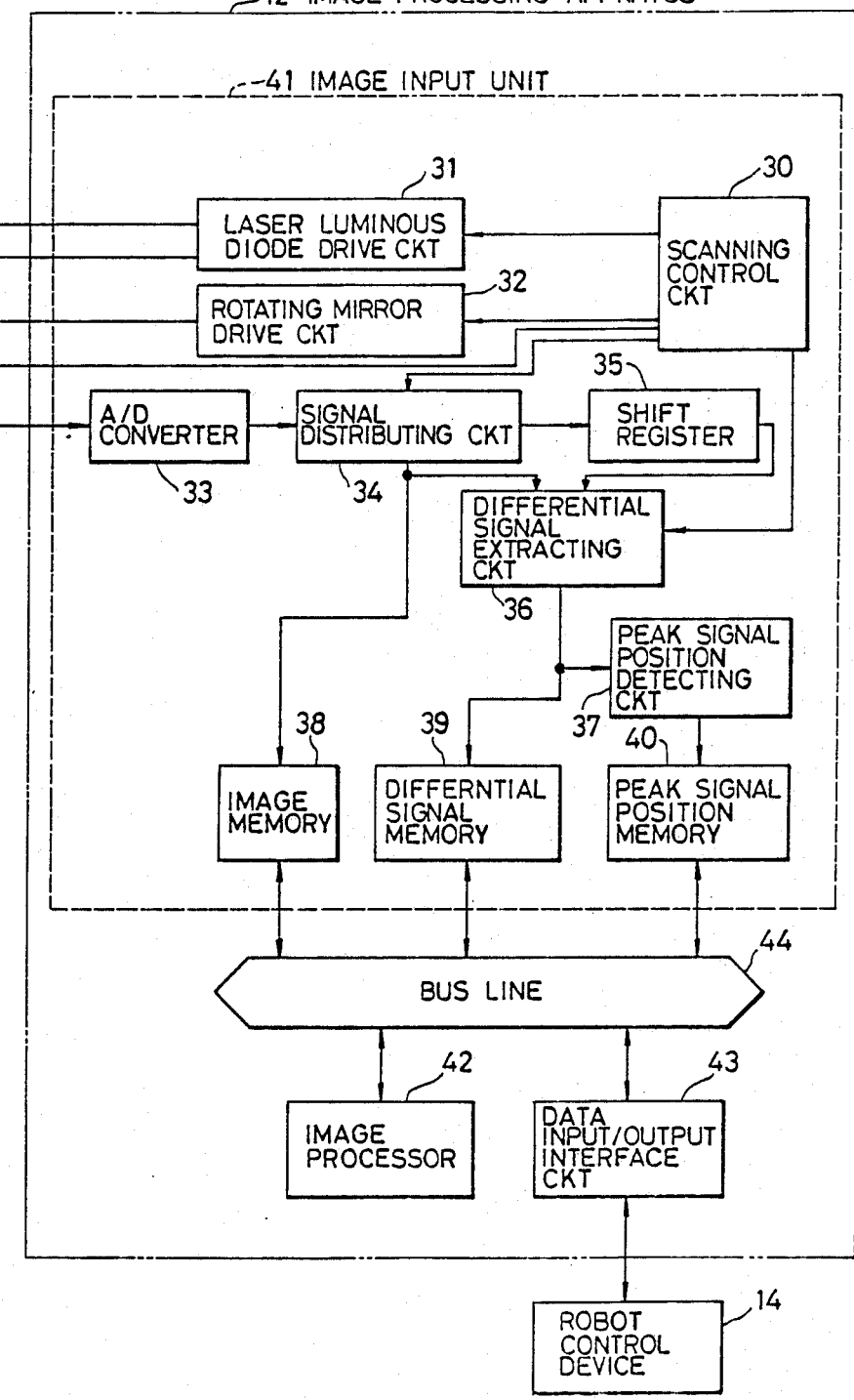

FIGS. 2A and 2B are parts of a folded a detailed block diagram corresponding to FIG. 1. The three-dimensional vision sensor 11 comprises a projector portion for slit-like light beams 28, which is composed of laser luminous diodes 21, slit-like light patterns 22, and projective lenses 23; and an image detector portion in which a linear image sensor 26 is combined with a rotating mirror 25, an imaging lens 24, and a sensor signal reading circuit 27 for the image sensor 26. Such arrangement affords a three-dimensional image sensor which can receive a slit image when the luminous diodes 21 are lit up and a background image when they are put out.

The internal structure of the image processing apparatus 12 is such that an image input portion 41 which is composed of various circuits 30–40 to be described later, an image processor 42 which is constructed of a microcomputer by way of example, and a data input/output interface circuit 43 which serves to communicate with the robot control device 14 are connected by a bus line 44. Here, the image input portion 41 is generally controlled by the scanning control circuit 30 thereof.

The scanning of one line of the image is performed as stated below.

First, the scanning control circuit 30 supplies the rotating mirror control circuit 32 with a positioning signal, by which the rotating mirror 25 is positioned. Thereafter, the laser luminous diode driving circuit 31 is turned "on" (brought into a closed state) to light up the luminous diodes 21. The slit image is applied from the linear image sensor 26 by the sensor signal reading circuit 27, and it is digitized by the A/D converter 33. While the slit image is input, the signal distribution circuit 34 is sending a video signal to the shift register 35. This shift register 35 can store data of the same number of pixels as that of the linear image sensor 26, and can hold the data until the next scanning cycle.

When the slit image has been input by one scanning line, the scanning control circuit 30 puts out the luminous diodes 21 and starts the sensor signal reading circuit 27 again so as to receive the background image. While the background image is input, the signal distribution circuit 34 sends a video signal to the differential signal extracting circuit 36 in accordance with a signal from the scanning control circuit 30. The differential signal extracting circuit 36 is simultaneously supplied with the slit-like light segmentation image data from the shift register 35. It finds the differences of the background image signals from the slit image signals for the same pixels, and stores the results into the differential signal memory 39. At the same time, the position $P_{max}$ of the maximum signal level within the scanning operation is detected by the peak signal position detecting circuit 37 (which is concretely disclosed in U.S. Pat. No. 4343553), and it is recorded in the peak signal position memory 40 after the end of the scanning operation.

Further, the differential signals $f_i$ in the vicinity of the position of the maximum signal level [the range of $(P_{max}-n)-(P_{max}+n)$] are read out from the differential signal memory 39, and the operation of $$P_{max}' = \frac{\sum_{i=P_{max}-n}^{i=P_{max}+n} P_i f_i}{\sum_{i=P_{max}-n}^{i=P_{max}+n} f_i}$$

is executed. Then, the position $P_{max}'$ of the maximum signal level can be precisely obtained. This position $P_{max}'$ of the maximum signal level is stored in the peak signal position memory 40.

When the image input operation corresponding to one line has ended in the above way, the scanning control circuit 30 positions the rotating mirror 25 to the next scanning line so as to repeat the image input operation of the next line.

When one image frame has been input in the above-stated manner, image inputing ends.

When the processing of one image frame has thus ended, a gradational image free from the slit-like light is stored in the image memory 38, and the positions of the brightest points found on the scanning lines struck by the slit-like light are stored in the peak signal position memory 40.

When the contents of the peak signal position memory 40 are utilized, a distance from the three-dimensional vision sensor 11 to the peak position of the slit-like light can be detected on the basis of the principle of a light segmentation type range finder which is described in, for example, U.S. patent application Ser. No. 482730 (EP Application No. 83103402.0) now U.S. Pat. No. 4,575,304, U.S. patent application Ser. No. 537095 (EP Application No. 83109972.6) now U.S. Pat. No. 4,611,292, or Nakagawa et al, Structured light method for inspection of solder joints and assembly robot vision system: Proceeding of 1st International Symposium of Robotics Research Bretton Woods, NH, U.S.A., Aug. 28–Sept. 2, 1983. When the detecting operations are performed as to the right and left slit-like light beams, the spatial position of the surface of the object 15 struck by the slit-like light beams can be determined.

Here, as disclosed in U.S. patent application Ser. No. 582555 (corresponding to Japanese Patent Application Laying-open Nos. 59-154574 and 59-154578), two-dimensional image processing is performed on the gradational image stored in memory 38 to extract the contour shape of the two-dimensional surface of the object 15, and the extracted contour shape of the two-dimensional surface is coordinate-transformed on the basis of the spatial position data of the three-dimensional surface extracted by utilizing the slit-like light as described before, whereby a three-dimensional surface shape can be obtained.

More specifically, assuming that the positions $(i_1, j_1)$, $(I_2, j_2)$ and $(i_3, j_3)$ of respective points P1, P2 and P3 on an image screen and the corresponding coordinates $(x_1, y_1, z_1)$, $(x_2, y_2, z_2)$ and $(x_3, y_3, z_3)$ viewed from the three-dimensional vision sensor 11 have been known from the slit-like light segmentation, the coordinates (x, y, z) of a contour point P (i, j) are given by the following equations:

$$x = x_1 + \{(i-i_1)a_i + (j-j_1)a_j\}z/z_1 \quad (1)$$

$$y = y_1 + \{(i-i_1)b_i + (j-j_1)b_j\}z/z_1 \quad (2)$$

$$z = z_1 + \{(i-i_1)c_i + (j-j_1)c_j\}z/z_1 \quad (3)$$

Here, $$a_i = \frac{(x_2 - x_1)(j_3 - j_1)z_1/z_2 - (x_3 - x_1)(j_2 - j_1)z_1/z_3}{(i_2 - i_1)(j_3 - j_1) - (i_3 - i_1)(j_2 - j_1)} \quad (4)$$

$$a_j = \frac{(x_2 - x_1)(i_3 - i_1)z_1/z_2 - (x_3 - x_1)(i_3 - i_1)z_1/z_3}{(j_2 - j_1)(j_3 - i_1) - (j_3 - j_1)(i_3 - i_1)} \quad (5)$$

$b_i$, $b_j$ and $c_i$, $c_j$ are respectively obtained by replacing x in Eqs. (4) and (5) with y and z.

In the above way, the three-dimensional coordinates of the contour line can be found.

Thus, the center and attitude of the surface can be found by utilizing diagrammatical primary and secondary moments, and the position and attitude of the object can be determined.

When the data are sent to the robot control device 14 through the input/output interface circuit 43 and then given to the robot 13 as position data, the robot 13 can perform an operation such as gripping for the object 15.

Figure 3:
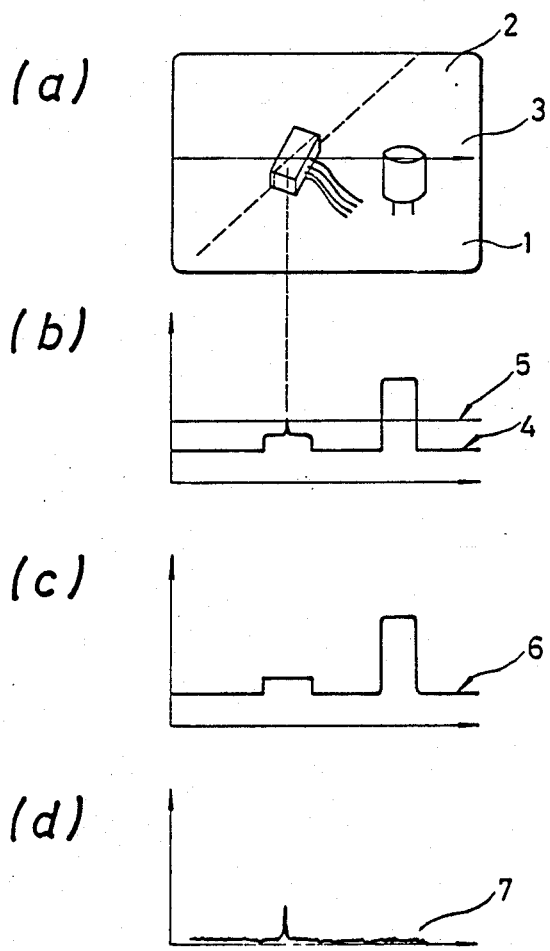
FIGS. 3(a)–3(d) are diagrams for explaining the basic principle of the light segmentation extraction circuit according to the present invention.
Figure 4:
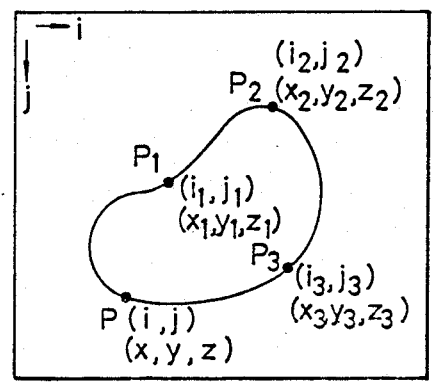
FIG. 4 is a conceptual diagram showing the three-dimensional positions of three points on a two-dimensional image which is detected by a three-dimensional vision sensor.

Referring now to FIGS. 3(a)–3(d), the basic principle of the slit-like light segmentation extraction according to the present invention will be described. In an image in FIG. 3(a), the sensor output 4 of one scanning line 3 is schematically graphed as shown in FIG. 3(b). On the other hand, the sensor output 6 of the scanning line produced without projecting slit-like light as shown in FIG. 3(c). As illustrated in FIG. 3(d), when the difference 7 is obtained between the two image outputs, a background image part almost consists of only noise components, and only a signal component based on the slit-like light segmentation can be clearly taken out.

Although, in the above embodiment, the shift register 35 has a storage capacity corresponding to one raster, it may well be constructed so as to store signals of one image frame and to be fed with the signals of one image frame by revolving the rotating mirror 25 with the luminuous diodes 21 put out. In this case, the signal distribution circuit 34 is changed-over, and the luminous diodes 21 are lit up, whereupon the slit-like light segmentation image corresponding to one image frame is input. Then, the background image read out from the shift register 35 is subtracted from the input light segmentation image by the differential signal extracting circuit 36. Thus, the differential signals can be extracted.

As described above in detail, according to the present invention, in an image input apparatus which applies the slit-like light segmentation system, components possessed by a background image can be removed from an image of slit-like segmentation, so that segmentation extraction without the influence of the background image can be performed. In addition, even when the brightness of external light has fluctuated, the fluctuant component can be eliminated, so that the threshold value of the slit-like light segmentation extraction, etc. need not be changed, and stable extraction is possible. Accordingly, remarkable effects are attained for enhancing the precision, efficiency and stability of the image recognition processing of a vision sensor in a robot or a automaton.

We claim:

1. A three-dimensional vision system, comprising:
   three-dimensional vision means for projecting slit-like light onto an object to-be-handled over each of a plurality of scanning lines and for reading image signals representing both a resulting slit image of the object while the slit-like light is projected over one of said plurality of scanning lines and a background image of the object along the same one of said plurality of scanning lines while no slit-like light is projected,
   an image input portion which controls illumination of the slit-like light to cause said vision means to sequentially project said slit-like light over each of said plurality of scanning lines, and also controls the reading of image signals representing both the slit-image and the background image along each of said scanning lines, and which performs extraction processing for each one of said plurality of scanning lines to obtain differential signals from the image signals representing a resulting slit image of the object along a scanning line and the image signals representing the background image of the object along the same scanning line to obtain said differential signals for each one of said scanning lines from the image signals read out, and
   means including means for extracting a position corresponding to a maximum value among said differential signals occurring along each of said scanning lines, for extracting a light segmentation line from each one of said differential signals,
   whereby an image processor can recognize a three-dimensional shape of the object on the basis of a plurality of said light segmentation lines extracted from said differential signals and the positions corresponding to the maximum value of each of one of said differential signals.

2. A three-dimensional vision system according to claim 1, wherein said image input portion comprises an image memory which stores the image without the projected slit-like light.

3. A three-dimensional vision system according to claim 1, wherein said image input portion further comprises peak position detection means for detecting and storing said position corresponding to a maximum value from among each one of the differential signals for each of said scanning lines.

4. The vision system of claim 1, wherein said image input portion comprises:
   control means for sequentially driving said vision means between a first state wherein said vision sensor projects slit-like light on the object while providing a first image of the object and a second state wherein said vision means projects no light on the object while providing a second image of the object.

5. The vision system of claim 1, wherein said vision means includes scanning means for providing said vision sensor with view of progressively varying perspective of the object along successive scanning lines.

6. The vision system of claim 4, wherein said vision means includes scanning means for providing said vision means with views of progressively varying perspective of the object along successive scanning lines during said first and second states.

7. The vision system of claim 1, wherein said image input portion comprises circuit means for receiving image signals from a first image provided by said vision means while said image input portion controls illumination of the object to effect a first state of illumination and for receiving image signals from a second image provided by said vision means while said image input portion controls illumination of the object to effect a second state of illumination, and for comparing said image signals from said first and second images to provide said differential signals.

8. The vision system of claim 4, wherein said image input portion comprises circuit means for simultaneously receiving and comparing image signals from said first and second images to provide said differential signals.

9. The vision system of claim 5, wherein said image input portion comprises circuit means for simultaneously receiving and comparing image signals from said first and second images to provide said differential signals.

10. The vision system of claim 1, wherein said image input portion comprises means responsive to generation of said differential image for detecting and storing a first value for the position of the maximum signal level occurring along said scanning line, and wherein said system further comprises means for calculating a second value for the position of said maximum signal level from said first value and differential signals occurring along said scanning line in the vicinity of the position defined by said first value.

11. The vision system of claim 4, wherein said image input portion comprises means responsive to generation of said differential image for detecting and storing a first value for the position of the maximum signal level occurring along said scanning line, and wherein said system further comprises means for calculating a second value for the position of said maximum signal level from said first value and differential signals occurring along said scanning line in the vicinity of the position defined by said first value.

12. The vision system of claim 5, wherein said image input portion comprises means responsive to generation of said differential image for detecting and storing a first value for the position of the maximum signal level occurring along said scanning line, and wherein said system further comprises means for calculating a second value for the position of said maximum signal level from said first value and differential signals occurring along said scanning line in the vicinity of the position defined by said first value.

13. The vision system of claim 7, wherein said system further comprises means for calculating a second value for the position of said maximum signal level from said first value and differential signals occurring along said scanning line in the vicinity of the position defined by said first value.

14. The vision system of claim 1, wherein said three-dimensional image vision means comprises means controllable by said image input portion for independently projecting a pair of slit-like light beams onto the object, and said image portion comprises memory means for storing said image occurring along each said scanning line without said slit-like light.

15. The vision system of claim 2, wherein said three-dimensional image vision means comprises means controllable by said image input portion for independently projecting a pair of slit-like light beams on the object.

16. A process for recognizing the three-dimensional shape of an object, comprising:
projecting a beam of slit-like light upon an object during a first operational state and projecting no slit-like light upon the object during a second operational state;
generating first and second image signals representative of images of the object formed along a scanning line during each of said first and second operational states;
simultaneously processing said first and second image signals taken along said scanning line to provide differential signals representative of differences in amplitude between said first and second signals, whereby a light segmentation line based on the projected slit-like light beam is extracted from said images.

17. The process of claim 16, further comprised of detecting the position of the maximum signal level occurring along each said scanning line.

18. The process of claim 16, further comprised of detecting a first value for the position of the maximum signal level occurring along each said scanning line, and calculating a second value for the position of said maximum signal level from said first value and the differential signals occurring along each said scanning line in the vicinity of said position defined by said first value.

19. A three-dimensional vision system, comprising:
three-dimensional vision means having a projector for projecting slit-like light defining a plane onto an object during a first operational state and projecting no slit-like light upon the object during a second operational state, having an image sensor including an array of pixels for detecting images of the object from a direction inclined against the plane and coverting the images of the object into image signals, and sensor signal reading means for reading the image signals, said images of the object including a slit image resulting from illumination of the object with the slit-like light during said first operational state and a background image occurring while no slit-like light is projected by aid projector onto the object;
scanning control means for sequentially controlling over each of a plurality of scanning lines, the presence of said slit-like light emanating from the projector during said first operational state and the absence of said slit-like light during said second operational state, and for controlling the reading of image signals from said sensor signal reading means to provide image signals representing one of said images detected during said first operational state and one of said images formed during said second operational state for each of said plurality of scanning lines;
converter means for converting the image signals into digital signals;
memory means for storing the digital signals read-out from the sensor signal reading means;
differential signal extracting means controlled by said scanning control means and coupled to said converter means and said memory means, for sequentially sampling the digital signals formed from said image signals for each of said scanning lines during both of said operational states, and for extracting a differential image signal for each of said scanning lines from the digital signals formed for each of said scanning lines;
light segmentation line extracting means including means for extracting a position corresponding to the maximum value of said differential image signal along each of said scanning lines for extracting a light segmentation line from each said differential image signal obtained by the differential signal extracting means; and
an image processor for recognizing the three-dimensional shape of the object in accordance with the light segmentation line extracted by the light segmentation line extracting means.

20. A three-dimensional vision system according to claim 19, wherein said memory means stores the digital signals resulting from conversion of image signals occurring during said second operational state.

21. A three-dimensional vision system, comprising:
three-dimensional vision means for projecting planar light beams on objects to-be-handled and for reading from an array of pixels, image signals representing resulting images of the objects occurring over a plurality of scanning lines, with a first one of said images in each of said scanning lines being a resulting image occurring during illumination of the objects with projected slit-like light and a second one of said images being a background image occurring in the same scanning line during the absence of illumination of the objects with said slit-like light;
an image input portion which sequentially controls illumination of objects by the light beams to provide one image of the objects during the first operational state and another image of the object during the second operational state for each one of said scanning lines, controls the reading of the images, and which performs extraction processing to obtain differential signals for each of said scanning lines from the image signals read representing a resulting slit image of the object along said scanning lines and representing the background image of the object along corresponding scanning lines;

means for extracting a position corresponding to a maximum value among said differential signals for each of said scanning lines;

means for determining a light segmentation line from each one of said differential signals extracted by said input portion; and an image processor can recognize a three-dimensional shape of the object on the basis of a plurality of said light segmentation line extracted from said differential signals and the positions corresponding to the maximum value of each one of said differential signals.

22. A three-dimensional vision system according to claim 21, wherein said determining means comprises peak position detection means for detecting and storing said position from among the differential signals for each one of said scanning lines.

23. The vision system of claim 22, wherein said image input portion comprises:

control means for sequentially driving said vision means between a first state wherein said vision sensor projects planar light beams on objects along a series of scanning lines while alternately providing said first images of the objects along each one of said scanning lines and a second state wherein said vision means projects no light on the objects while providing said second images of the object along the same ones of said scanning lines.

24. The vision system of claim 21, wherein said vision means includes scanning means for providing said vision sensor with view of progressively varying perspective of the objects along successive scanning lines.

25. The vision system of claim 21, wherein said image input portion comprises circuit means for receiving said differential signals from a first image provided by said vision sensor while said image input controls illumination of the object to effect a first state of illumination and for simultaneously receiving said differential signals from a second image provided by said vision sensor while said image input controls illumination of the object to effect a second state of illumination, and for comparing said differential signals from said first and second images to provide said differential image.

* * * * *